(12) United States Patent
Ingle et al.

(10) Patent No.: US 9,606,960 B2
(45) Date of Patent: Mar. 28, 2017

(54) VECTOR INDIRECT ELEMENT VERTICAL ADDRESSING MODE WITH HORIZONTAL PERMUTE

(71) Applicant: QUALCOMM Incorporated, San Diego, CA (US)

(72) Inventors: Ajay Anant Ingle, Austin, TX (US); David J. Hoyle, Austin, TX (US); Marc M. Hoffman, Mansfield, MA (US)

(73) Assignee: QUALCOMM Incorporated, San Diego, CA (US)

( * ) Notice: Subject to any disclaimer, the term of this patent is extended or adjusted under 35 U.S.C. 154(b) by 869 days.

(21) Appl. No.: 13/834,785

(22) Filed: Mar. 15, 2013

(65) Prior Publication Data

US 2014/0281372 A1   Sep. 18, 2014

(51) Int. Cl.
*G06F 15/80* (2006.01)
*G06F 9/30* (2006.01)

(52) U.S. Cl.
CPC ...... *G06F 15/8053* (2013.01); *G06F 9/30018* (2013.01); *G06F 9/30032* (2013.01); *G06F 9/30036* (2013.01); *G06F 9/30109* (2013.01)

(58) Field of Classification Search
CPC ............. G06F 15/8053; G06F 9/30036; G06F 9/30109; G06F 9/30032; G06F 9/30018
See application file for complete search history.

(56) References Cited

U.S. PATENT DOCUMENTS 6,233,671 B1 * 5/2001 Abdallah ............ G06F 9/30014
712/210
6,266,758 B1   7/2001 van Hook et al.
(Continued)

FOREIGN PATENT DOCUMENTS

JP         3845711 B2    11/2006
WO    2006033056 A2     3/2006
(Continued)

OTHER PUBLICATIONS

Second Written Opinion for PCT/US2014/023849, mailed Feb. 18, 2015, 6 pages.
(Continued)

*Primary Examiner* — Aimee Li
*Assistant Examiner* — Courtney Carmichael-Moody
(74) *Attorney, Agent, or Firm* — Withrow & Terranova, PLLC

(57) ABSTRACT

An example method for placing one or more element data values into an output vector includes identifying a vertical permute control vector including a plurality of elements, each element of the plurality of elements including a register address. The method also includes for each element of the plurality of elements, reading a register address from the vertical permute control vector. The method further includes retrieving a plurality of element data values based on the register address. The method also includes identifying a horizontal permute control vector including a set of addresses corresponding to an output vector. The method further includes placing at least some of the retrieved element data values of the plurality of element data values into the output vector based on the set of addresses in the horizontal permute control vector.

24 Claims, 7 Drawing Sheets

(56) References Cited

U.S. PATENT DOCUMENTS

| | | | |
|---|---|---|---|
| 6,446,198 B1* | 9/2002 | Sazegari | G06F 7/764 |
| | | | 712/300 |
| 7,197,625 B1 | 3/2007 | van Hook et al. | |
| 8,140,932 B2 | 3/2012 | Blankenship | |
| 8,161,271 B2 | 4/2012 | Luick et al. | |
| 2003/0167460 A1 | 9/2003 | Desai et al. | |
| 2004/0054879 A1 | 3/2004 | Macy, Jr. et al. | |
| 2009/0187746 A1 | 7/2009 | Symes et al. | |
| 2009/0249026 A1 | 10/2009 | Smelyanskiy et al. | |
| 2010/0318766 A1 | 12/2010 | Tsuji | |
| 2012/0060016 A1 | 3/2012 | Eichenberger et al. | |
| 2012/0260062 A1 | 10/2012 | Derby et al. | |
| 2014/0108769 A1* | 4/2014 | Jha | G06F 9/30036 |
| | | | 712/205 |
| 2014/0149713 A1* | 5/2014 | Jha | G06F 9/30032 |
| | | | 712/4 |
| 2014/0181464 A1* | 6/2014 | Forsyth | G06F 9/00 |
| | | | 711/214 |

FOREIGN PATENT DOCUMENTS

| | | |
|---|---|---|
| WO | 2012024087 A2 | 2/2012 |
| WO | 2013095672 A1 | 6/2013 |

OTHER PUBLICATIONS

International Preliminary Report on Patentability for PCT/US2014/023849, mailed Jun. 12, 2015, 22 pages.

International Search Report and Written Opinion for Patent Application No. PCT/US2014/023849, mailed Aug. 29, 2014, 13 pages.

* cited by examiner

VECTOR INDIRECT ELEMENT VERTICAL ADDRESSING MODE WITH HORIZONTAL PERMUTE

FIELD OF DISCLOSURE

The present disclosure generally relates to processors, and more particularly to processing elements in a processor.

BACKGROUND

A processor may receive a data stream and store the data in registers. The data stream may span multiple registers and include a subset of data that is of interest to the processor. In an example, a user may use a handset that includes a processor. A signal may include data associated with the user and a reference signal may be sent from a tower to the handset. The reference signal may be interlaced with the user's data along with other data. For example, the signal may include the reference signal and data associated with other users. The signal may include the user's data along with the data of other users because if a packet is lost, a smaller amount of the user's data is lost compared to a whole packet including the user's data. This may mitigate the effect of losing a packet on a per user basis.

It may be desirable for the processor to efficiently retrieve, for example, the data of interest (e.g., reference signal) and organize the data of interest that is interleaved in the data stream.

BRIEF SUMMARY

This disclosure relates to processors. Methods, systems, and techniques for processing elements in a processor are provided.

According to an embodiment, a method for placing one or more element data values into an output vector includes identifying a vertical permute control vector including a plurality of elements. Each element of the plurality of elements includes a register address. The method also includes for each element of the plurality of elements, reading a register address from the vertical permute control vector. The method further includes retrieving a plurality of element data values based on the register addresses. The method also includes identifying a horizontal permute control vector including a set of addresses corresponding to an output vector. The method further includes placing at least some of the retrieved element data values of the plurality of element data values into the output vector based on the set of addresses in the horizontal permute control vector.

According to another embodiment, an apparatus includes a processor that is operable to identify a vertical permute control vector including a plurality of elements, each element of the plurality of elements including a register address. The processor is also operable to for each element of the plurality of elements, read a register address from the vertical permute control vector. The processor is also operable to retrieve a plurality of element data values based on the register addresses. The processor is also operable to identify a horizontal permute control vector including a set of addresses corresponding to an output vector. The processor is also operable to place at least some of the retrieved element data values into the output vector based on the set of addresses in the horizontal permute control vector.

According to another embodiment, a computer-readable medium has stored thereon computer-executable instructions for performing operations, including identifying a vertical permute control vector including a plurality of elements, each element of the plurality of elements including a register address; for each element of the plurality of elements, reading a register address from the vertical permute control vector; retrieving a plurality of element data values based on reading the one or more register addresses; identifying a horizontal permute control vector including a set of addresses corresponding to an output vector, and placing at least some of the retrieved element data values of the plurality of element data values into the output vector based on the set of addresses in the horizontal permute control vector.

According to another embodiment, an apparatus for placing one or more element data values into an output vector includes means for identifying a vertical permute control vector including a plurality of elements, each element of the plurality of elements including a register address; means for, for each element of the plurality of elements, reading a register address from the vertical permute control vector; means for retrieving a plurality of element data values based on reading the one or more register addresses; means for identifying a horizontal permute control vector including a set of addresses corresponding to an output vector; and means for placing at least some of the retrieved element data values of the plurality of element data values into the output vector based on the set of addresses in the horizontal permute control vector.

According to another embodiment, a method for writing element data values into an output vector includes reading an input vector including a plurality of element data values. The method also includes identifying a horizontal permute control vector including a set of addresses. The method further includes rearranging at least some of the element data values of the plurality of element data values in the input vector based on the set of addresses in the horizontal permute control vector. The method also includes placing the rearranged plurality of element data values in a temporary vector. The method further includes identifying a vertical permute control vector including a plurality of elements. Each element of the plurality of elements includes a register address. The method also includes placing the element data values in the temporary vector into at least one vector register based on the register addresses in the vertical permute control vector.

According to another embodiment, an apparatus includes a processor that is operable to read an input vector including a plurality of element data values. The processor is also operable to identify a horizontal permute control vector including a set of addresses. The processor is also operable to rearrange at least some of the element data values in the input vector based on the set of addresses in the horizontal permute control vector. The processor is also operable to place the rearranged plurality of element data values in a temporary vector. The processor is also operable to identify a vertical permute control vector including a plurality of elements, each element of the plurality of elements including a register address. The processor is also operable to place the element data values in the temporary vector into at least one vector register based on the register addresses in the vertical permute control vector.

According to another embodiment, a computer-readable medium has stored thereon computer-executable instructions for performing operations, including reading an input vector including a plurality of element data values; identifying a horizontal permute control vector including a set of addresses; rearranging at least some of the element data values of the plurality of element data values in the input vector based on the set of addresses in the horizontal permute control vector; placing the rearranged plurality of element data values in a temporary vector: identifying a vertical permute control vector including a plurality of elements, each element of the plurality of elements including a register address; and placing the element data values in the temporary vector into at least one vector register based on the register addresses in the vertical permute control vector.

According to another embodiment, an apparatus for writing element data values into an output vector includes means for reading an input vector including a plurality of element data values: means for identifying a horizontal permute control vector including a set of addresses; means for rearranging at least some of the element data values of the plurality of element data values in the input vector based on the set of addresses in the horizontal permute control vector; means for placing the rearranged plurality of element data values in a temporary vector; means for identifying a vertical permute control vector including a plurality of elements, each element of the plurality of elements including a register address; and means for placing the element data values in the temporary vector into at least one vector register based on the register addresses in the vertical permute control vector.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example Instructions
A. Example Read Instruction
B. Example Write Instruction
C. Scalar Values
III. Example Register File
IV. Example Methods
V. Example Wireless Device I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A processor may include a vector register file including a plurality of vector registers. The vector registers may store element data values, and a subset of the data associated with the element data values may be of interest. It may be desirable to read the subset of the element data values from the plurality of vector registers (e.g., a reference signal interlaced with user data) and distribute the subset of the element data values into an output vector.

In an example, two sets of controls may be used to retrieve the subset of element data values and place one or more of the subset of element data values into an output vector. The first set of controls may be a vertical permute control vector that includes register addresses to determine which column elements in the vectors registers of the plurality of vector registers to read out. For example, the vertical permute control vector may include the vertical addresses from which to read the element data values. The second set of controls may be a horizontal permute control vector that includes a set of addresses corresponding to an output vector. The horizontal permute control vector may determine the horizontal distribution of the retrieved subset of element data values in the output vector. At least some of the retrieved subset of element data values may be placed into the output vector based on the set of addresses in the horizontal permute control vector.

In another example, two sets of controls may be used for writing element data values into at least one output vector. In an example, an input vector including a plurality of element data values may be read. At least some of the element data values of the plurality of element data values in the input vector may be rearranged based on the set of addresses in the horizontal permute control vector, and the rearranged element data values may be placed in a temporary vector. The element data values in the temporary vector may be placed into at least one output vector based on the vertical permute control vector. The vertical permute control vector may include a plurality of elements, each element of the plurality of elements including a register address of a vector register in the vector register file.

Figure 1:
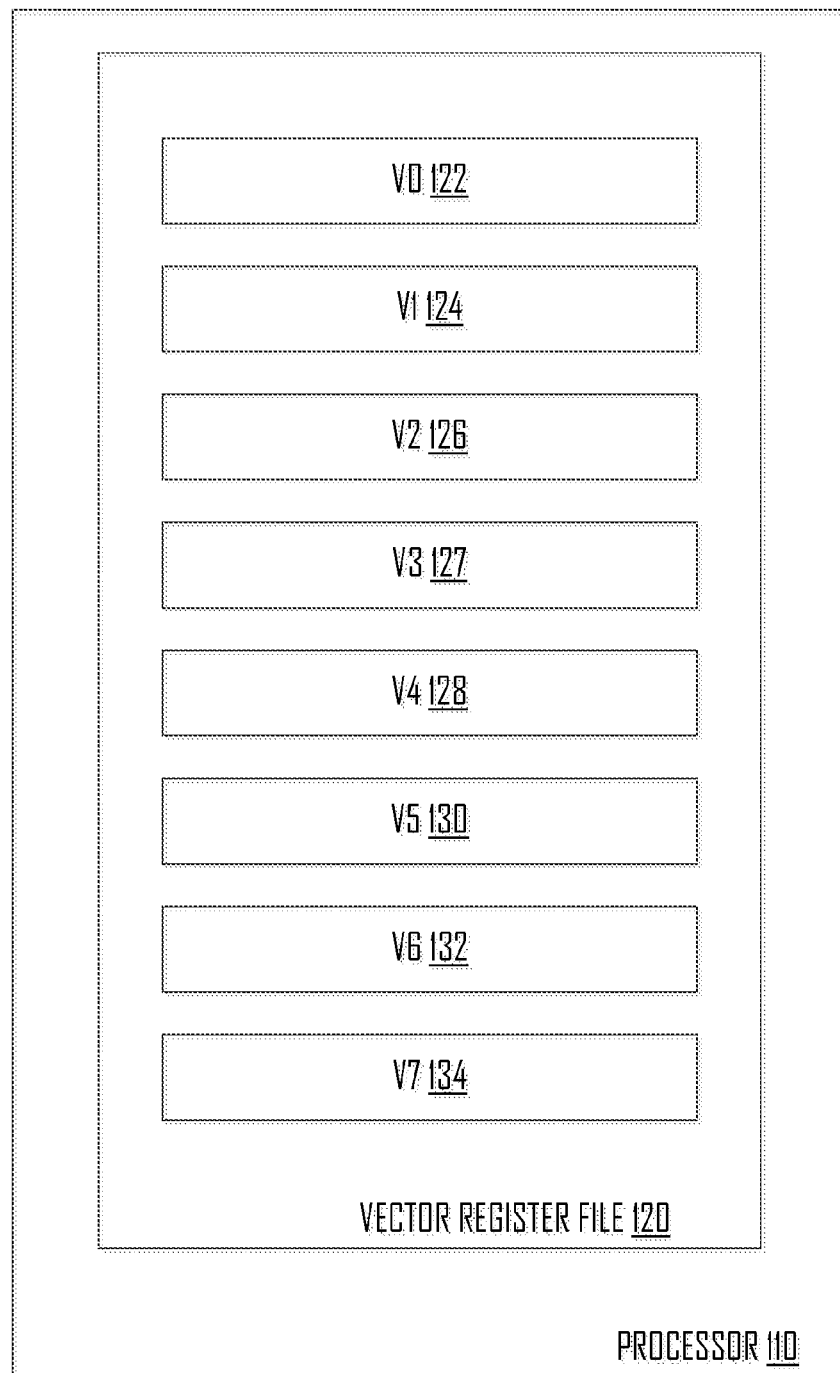
FIG. 1 is a block diagram illustrating a processor including a vector register file, according to an embodiment.

FIG. 1 is a block diagram illustrating a processor 110 including a vector register file 120, according to an embodiment.

Vector register file 120 may include N general purpose vector registers, where N is a whole number that is greater than zero. Each vector register may be packed with a vector of M elements, where M is a whole number that is greater than zero. An element may refer to the smallest granularity of data that may be read from the vector register. Within each vector register, data may be written or read, for example, as bytes (8-bits), short words (16 bits), words (32 bits), or double-words (64 bits). In an example, vector register file 120 includes 32 vector registers (N=32) and 32 32-bit elements (M=32), each vector register being 1024 bits wide (32 elements×32 bits).

In FIG. 1, vector register file 120 includes vector registers V0 (122). V1 (124), V2 (126), V3 (127), V4 (128), V5 (130), V6 (132), and V7 (134). Although vector register file 120 is illustrated in FIG. 1 as including eight vector registers, other embodiments having fewer than eight or greater than eight vector registers in vector register file 120 are within the scope of this disclosure. In an example, vector register file 120 includes 32 vectors registers V0-V31.

Processor 110 may load elements into the vector registers and read values from the vector registers. In an example, a subset of elements associated with vector registers V4, V5, V6, and V7 may be processed based on the vertical and horizontal permute control vectors.

III. Example Instructions

A. Example Read Instruction

Processor 110 may receive a read instruction that places one or more element data values into an output vector.

Figure 2:
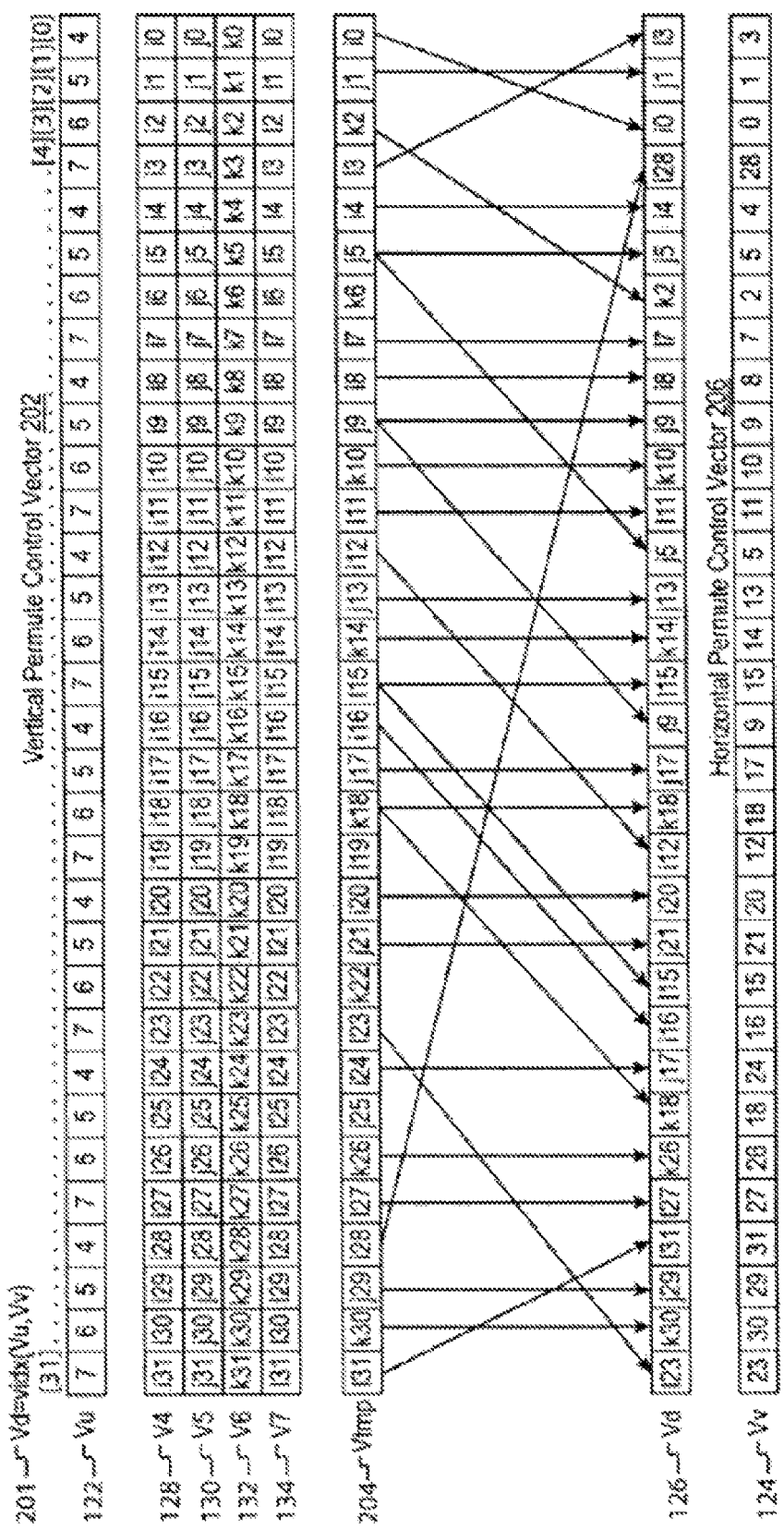
FIG. 2 is a block diagram illustrating one or more element data values being placed into an output vector, according to an embodiment.

FIG. 2 is a block diagram 200 illustrating one or more element data values being placed into an output vector, according to an embodiment.

Diagram 200 includes an example read instruction 201 that includes Vd=vidx (Vu, Vv). Instruction 201 includes reading two input vector registers (e.g., Vu and Vv) and writing an output to an output vector register (e.g., Vd). Vector registers Vu, Vv, and Vd may be any of the vector registers V0-V7 from vector register file 120, where u, v, and d may be any value from zero to seven. The instruction may convert to an opcode that specifies a particular value for Vu, Vv, and Vd. In an example, Vu=V0, Vv=V1, and Vv=V3. Vu may include the vertical permute control vector, Vv may include the horizontal permute control vector, and Vd may include the output vector, and each of vector registers. Each of Vu, Vx, and Vv may be any of the vector registers in vector register file 120.

Processor 110 may receive and execute instruction 201. Executing instruction 201 may include identifying the vertical permute control vector, reading one or more memory addresses from the vertical permute control vector, and retrieving a plurality of element data values based on the read memory addresses. Executing instruction 201 may also include identifying the horizontal permute control vector and placing at least some of the retrieved element data values into the output vector based on the horizontal permute control vector.

Diagram 200 includes a plurality of vector registers that may be included in vector register file 120. The plurality of vector registers includes vector registers V4, V5, V6, and V7, and each vector register may include element data values. It may be desirable to retrieve a subset of the element data values stored in the plurality of vector registers.

Processor 110 may identify a vertical permute control vector 202 including a plurality of elements. In an embodiment, processor 110 receives data associated with an instruction and splits the received data into the plurality of elements. The plurality of elements may be placed into the vertical permute control vector, each element of the plurality of elements including a register address.

In FIG. 2, vertical permute control vector 202 may be stored in vector register Vu 122 from vector register file 120. Accordingly, when processor 110 identifies the vertical permute control vector, processor 110 may identify vector register Vu in vector register file 120. The vector registers in vector register file 120 may be visible to a programmer and can be used to indirectly read from vector registers in vector register file 120. Referring to the above example, only a subset of element data values in vector registers V4. V5, V6, and V7 may store the reference signal, and the rest of the elements data values may include other data that is not of interest. The subset of element data values of interest may span multiple vector registers. To retrieve these particular element data values, the programmer may program this pattern into Vu to extract the element data values of interest stored at the appropriate register addresses.

Vector register Vu may include 32 elements, and each element may include a 32 bit register address. For example, Vu[0]=4 and includes the register address for vector register V4[0], Vu[1]=5 and includes the register address for vector register V5[1], Vu[2]=6 and includes the register address for vector register V6[2], and Vu[3]=7 and includes the register address for vector register V7[3].

A plurality of element data values may be retrieved based on reading the register addresses. In particular, the register address in the vertical permute control vector may be used as an indirect address to retrieve the appropriate element data value from the vector register file. In this way, the one or more register addresses stored in vertical permute control vector 202 may be used as an indirect access to the element data value stored at the corresponding register address. An indirect read may be in contrast to a direct read, which specifies an element data value rather than a register address. For an indirect read, the register address may be read and used to retrieve the element data value of interest.

In an example, after reading the register address for vector register V4 from Vu[0], processor 110 may retrieve the element data value "i0," which is the element data value stored at vector register V4[0]. Similarly, after reading the register address for vector register V5 from Vu[1], processor 110 may retrieve the element data value "j1," which is the element data value stored at vector register V5[1]. Similarly, after reading the register address for vector register V6 from Vu[2], processor 110 may retrieve the element data value "k2," which is the element data value stored at vector register V6[2]. Similarly, after reading the register address for vector register V7 from Vu[3], processor 110 may retrieve the element data value "l3," which is the element data value stored at vector register V7[3]. Processor 110 may perform similar actions for the other register addresses stored in Vu. In an embodiment, processor 110 is a single instruction, multiple data (SIMD) processor and performs the instructions described in this disclosure in parallel. For example, processor 110 may read the register addresses in Vv in parallel and retrieves the element data values based on the read register address in parallel.

Processor 110 may place the retrieved plurality of element data values in a temporary vector register. Diagram 200 includes a vector register Vtmp 204. Processor 110 may be a pipelined processor, and Vtmp 204 may be a temporary pipeline vector register used to store intermediate results. In another example. Vtmp 204 may be a vector register in vector register file 120. The element data values retrieved based on the register addresses in Vu may be placed into Vtmp 204.

For example, in FIG. 2 the "i0" that was read from vector register V4[0] is placed into Vtmp[0], the "j1" that was read from vector register V5[1] is placed into Vtmp[1], the "k2" that was read from vector register V6[2] is placed into Vtmp[2], and the "l3" that was read from vector register V7[3] is placed into Vtmp[3]. Processor 110 may perform similar actions for all of the other retrieved element data values based on the register addresses in the vertical permute control vector.

In an embodiment, processor 110 identifies a horizontal permute control vector 206 including a set of addresses corresponding to an output vector. Horizontal permute control vector 206 has a set of controls that determines the placement of the retrieved data value elements in the output vector. Processor 110 may place at least some of the retrieved element data values of the plurality of element data values into the output vector based on the set of addresses in the horizontal permute control vector. For example, the element data values in Vtmp 204 may be permuted and placed into the output vector. In an example, the horizontal permute is implemented using a crossbar. In this example, at least some of the retrieved element data values may be placed into the output vector using the crossbar.

In FIG. 2, the horizontal permute control vector may be stored in vector register Vv (124), and the output vector may be Vd (126) from vector register file 120.

In an example, Vv[0]=3, indicating that the element data value corresponding to Vtmp[3] belongs at Vd[0]. Accordingly, "i3," the element data value corresponding to Vtmp [3], is placed into output vector Vd[0]. Similarly, Vv[1]=1, indicating that the element data value corresponding to Vtmp[1] belongs at Vd[1]. Accordingly. "j1," the element data value corresponding to Vtmp[1], is placed into output vector Vd[1]. Similarly, Vv[2]=0, indicating that the element data value corresponding to Vtmp[0] belongs at Vd[2]. Accordingly, "i0," the element data value corresponding to Vtmp[0], is placed into output vector Vd[2]. Similarly, Vv[3]=28, indicating that the element data value corresponding to Vtmp[28] belongs at Vd[3]. Accordingly, "i28," the element data value corresponding to Vtmp[28], is placed into output vector Vd[3]. Processor 110 may perform similar actions to place the other element data values in Vtmp 204 into output vector Vd 126.

Vector register 120 may have a read port that is given an address. In an example, in a first cycle, processor 110 reads the register address from the vertical permute control vector (e.g., vector register Vu in vector register file 120 of FIG. 1). Processor 110 may perform 32 different operations in one instruction of the same type. For example, if vector register Vu includes the vertical permute control vector, processor 110 may perform the read operation on Vu[0]-Vu[31] such that processor 110 simultaneously reads the 32 register addresses from vector register Vu. Internally in the next cycle, processor 110 may read from vector register file 120 again based on the read register addresses to retrieve the appropriate element data values. Processor 110 may perform the retrieval operation such that processor 110 simultaneously retrieves the 32 element data values based on the read register addresses from vector register Vu. Processor 110 may simultaneously place the 32 retrieved element data values into Vtmp.

The 32 retrieved element data values stored in Vtmp may be horizontally distributed in the output vector using the horizontal permute control vector. The horizontal permute control vector may include the set of addresses corresponding to the output vector. Processor 110 may identify the horizontal permute control vector and place at least some of the retrieved element data values of the plurality of element data values into the output vector based on the set of addresses in the horizontal permute control vector. Processor 110 may simultaneously place the 32 retrieved element data values into the output vector based on the set of addresses in the horizontal permute control vector. The output vector may then include the element data values of interest.

B. Example Write Instruction

Processor 110 may also receive a write instruction that writes element data values into at least one vector register.

Processor 110 may use the vertical permute control vector and the horizontal permute control vector to write element data values into at least one vector register. The write instruction may be a write version analog of the read instruction discussed above.

Figure 3:
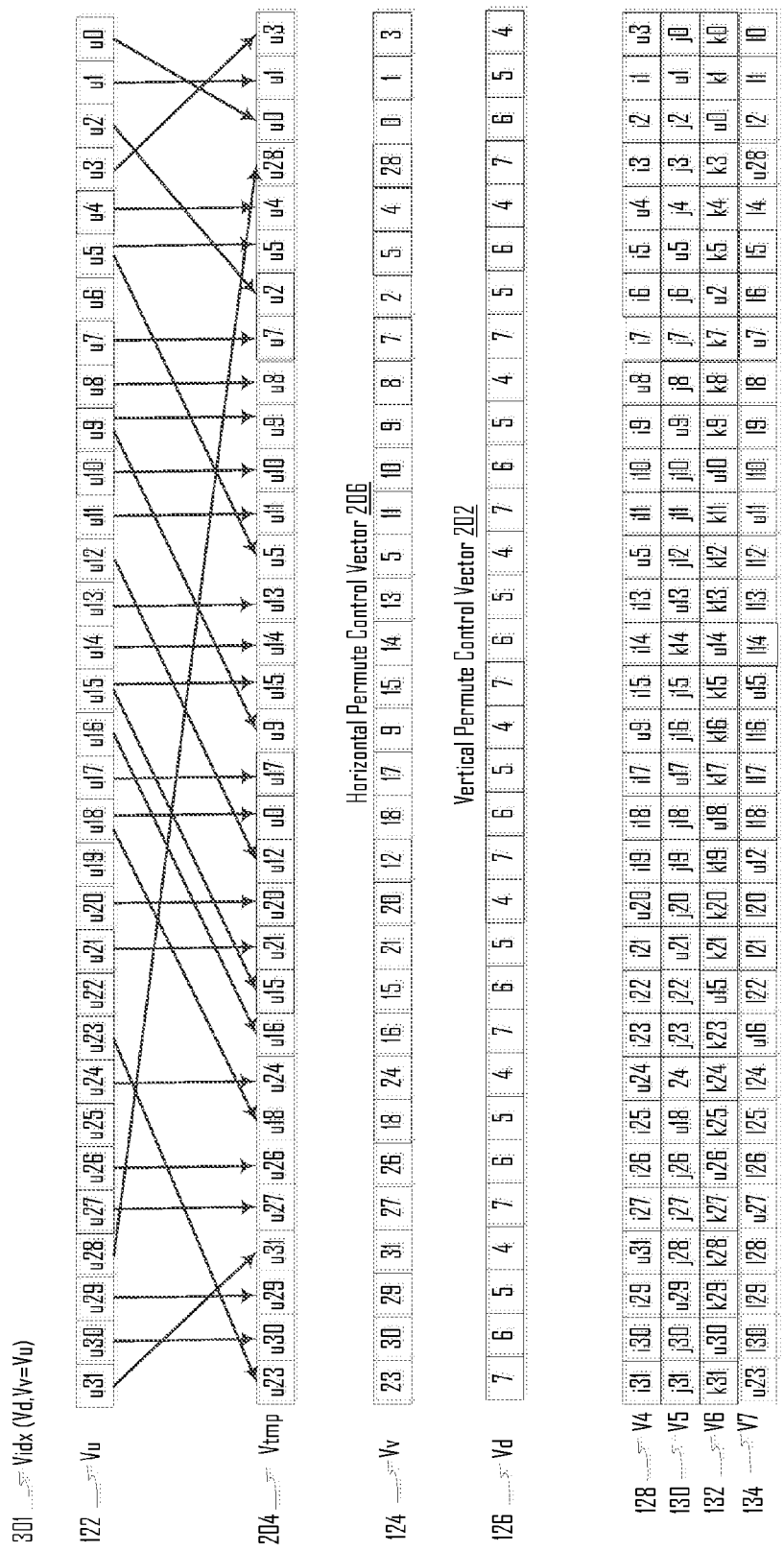
FIG. 3 is a block diagram illustrating the element data values being written into at least one output vector, according to an embodiment.

FIG. 3 is a block diagram 300 illustrating the element data values being written into at least one vector register, according to an embodiment.

Diagram 300 includes an example write instruction 301 that includes Vidx(Vd, Vv)=Vu. Instruction 301 includes reading an input vector register (e.g., vector register Vu) and writing element data values from the input vector register to at least one vector register (e.g., vector registers V4, V5, V6, and V7) based on the vertical permute control vector (e.g., vector register Vd) and the horizontal permute control vector (e.g., vector register Vv).

Vector registers Vu. Vv, and Vd may be any of the vector registers V0-V7 from vector register file 120, where u, v, and d may be any value from zero to seven. The instruction may convert to an opcode that specifies a particular value for Vu, Vv, and Vd. In an example, Vu=V0, Vv=V1, and Vv=V3. Vu may include the input vector register, Vv may include the horizontal permute control vector, and Vd may include the vertical permute control vector.

Processor 110 may receive and execute instruction 301. Executing instruction 301 may include reading an input vector Vu (122) including a plurality of element data values. For example, Vu[0]=u0, Vu[1]=u1, Vu[2]=u2, and Vu[3] =u3. In an example, the input vector includes the actual element data values that are written to at least one output vector.

The element data values in Vu may be read and permuted based on the horizontal permute control vector. Processor 110 may identify the horizontal permute control vector 206 including a set of addresses. Horizontal permute control vector 206 may be stored in vector register Vv (124) from vector register file 120. Accordingly, when processor 110 identifies the horizontal permute control vector, processor 110 may identify vector register Vv in vector register file 120. At least some of the element data values of the plurality of element data values in input vector Vu may be rearranged based on the set of addresses in horizontal permute control vector 206. The plurality of rearranged element data values may be placed in a temporary vector Vtmp 204.

In an example, the register address from Vv[0]=3, and processor 110 may retrieve the element data value "u3" stored at Vu[3] and place the retrieved element data value into Vtmp[0]. Similarly, the register address from Vv[1]=1, and processor 110 may retrieve the element data value "u1" stored at Vu[1] and place the retrieved element data value into Vtmp[1]. Similarly, the register address from Vv[2]=0, and processor 110 may retrieve the element data value "u0" stored at Vu[0] and place the retrieved element data value into Vtmp[2]. Processor 110 may perform similar actions to place the other element data values in Vu into temporary vector Vtmp.

Executing instruction 301 may also include identifying a vertical permute control vector 202 including a plurality of elements, each element of the plurality of elements including a register address. Vertical permute control vector 202 may be stored in vector register Vd (126) from vector register file 120. The element data values in Vtmp may be placed into at least one vector register based on the register addresses in the vertical permute control vector. In particular, the register addresses in Vd may be used to write the element data values in Vtmp in a vertical manner to at least one vector register.

For example, in FIG. 3. Vd[0]=4, indicating that the element data value corresponding to Vtmp[0] belongs at V4[0]. Accordingly, "i0," the element data value corresponding to Vtmp[0], is placed into vector register V4[0]. Similarly. Vd[1]=5, indicating that the element data value corresponding to Vtmp[1] belongs at V5[1]. Accordingly, "j1," the element data value corresponding to Vtmp[1], is placed into vector register V5[1]. Similarly, Vd[2]=6, indicating that the element data value corresponding to Vtmp[2] belongs at V6[2]. Accordingly. "k2," the element data value corresponding to Vtmp[2], is placed into vector register V6[2]. Similarly, Vd[3]=7, indicating that the element data value corresponding to Vtmp[3] belongs at V7[3]. Accordingly, "l3," the element data value corresponding to Vtmp [3], is placed into vector register V7[3]. Processor 110 may perform similar actions to place the other element data values in Vtmp 204 into one or more vector registers (e.g., vector registers V4, V5, V6, and V7). The vector registers may then store in the appropriate places the element data values from the input vector.

As discussed above and further emphasized here. FIGS. 1-3 are merely examples, which should not unduly limit the scope of the claims.

As illustrated above, the permute control vectors (e.g., vertical permute control vector and/or horizontal permute control vector) may be stored in dynamic registers that are updated as data is received by processor 110. For example, in FIG. 1, the vertical permute control vector is included in a vector register (e.g., Vu) and the horizontal permute control vector is also included in vector register (e.g., Vv) from the vector register file. This is not intended to be limiting, and the permute control vectors may be retrieved a number of ways.

For example, the patterns illustrated in the permute control vectors may be different from what is illustrated in FIGS. 2 and 3. For example, the vertical permute control vector in FIG. 2 has a pattern that specifies reading the element data values from vector registers V4. V5, V6, V7, V4, V5, V6, V7, etc. This is not intended to be limiting, and any pattern may be used. For instance, the programmer may program any pattern into the permute control vectors.

Further, in FIG. 3, all of the values in input vector Vu are written into at least one output vector. This is not intended to be limiting. For example, in another embodiment, one or more element data values in input vector Vu is not written into an output vector. Further, the element data values in input vector Vu may be written to a single vector register or to more than one vector register. In an example, if the vertical permute control includes the same register addresses, then all of the element data values in the Vtmp may be written to the same vector register (e.g., vector register V4).

C. Scalar Values

Additionally, a permute control vector (e.g., vertical permute control vector or horizontal permute control vector) may be stored in a memory location other than a vector register. In one example, the permute control vector may be stored in read-only memory (ROM) and read from ROM. In an example read instruction, processor 110 may receive an instruction such as Vd=Vidx(R,Vv), where R is a scalar value that references a data structure in ROM. The vertical permute control vector may be stored in the data structure (e.g., a table) in ROM. Accordingly, to identify the vertical permute control vector, processor 110 may identify the vertical permute control vector in the data structure in ROM using the scalar value.

In another example read instruction, processor 110 may receive an instruction such as Vd=Vidx(Vu,R), where R is a scalar value that references a data structure in ROM. The horizontal permute control vector may be stored in the data structure (e.g., a table) in ROM. Accordingly, to identify the horizontal permute control vector, processor 110 may identify the horizontal permute control vector in the data structure in ROM using the scalar value.

In another read example, processor 110 may receive an instruction such as Vd=Vidx(R1, R2), where R1 is a first scalar value that references a first data structure in ROM, and R2 is a second scalar value that references a second data structure in ROM. The vertical permute control vector may be stored in the first data structure (e.g., a table) in ROM, and horizontal permute control vector may be stored in the second data structure (e.g., a table) in ROM. Accordingly, to identify the vertical permute control vector, processor 110 may identify the vertical permute control vector in the first data structure in ROM using the first scalar value, and to identify the horizontal permute control vector, processor 110 may identify the horizontal permute control vector in the second data structure in ROM using the second scalar value.

Similarly, the write instructions may also include scalar values. For example, processor 110 may receive an instruction such as Vidx (R, Vv)=Vu, where R is a scalar value that references a data structure in ROM. The vertical permute control vector may be stored in the data structure (e.g., a table) in ROM. Accordingly, to identify the vertical permute control vector, processor 110 may identify the vertical permute control vector in the data structure in ROM using the scalar value.

In another example write instruction, processor 110 may receive an instruction such as Vidx (Vd, R)=Vu, where R is a scalar value that references a data structure in ROM. The horizontal permute control vector may be stored in the data structure (e.g., a table) in ROM. Accordingly, to identify the horizontal permute control vector, processor 110 may identify the horizontal permute control vector in the data structure in ROM using the scalar value.

In another write example, processor 110 may receive an instruction such as Vidx (R1, R2)=Vu, where R1 is a first scalar value that references a first data structure in ROM, and R2 is a second scalar value that references a second data structure in ROM. The vertical permute control vector may be stored in the first data structure (e.g., a table) in ROM, and horizontal permute control vector may be stored in the second data structure (e.g., a table) in ROM. Accordingly, to identify the vertical permute control vector, processor 110 may identify the vertical permute control vector in the first data structure in ROM using the first scalar value, and to identify the horizontal permute control vector, processor 110 may identify the horizontal permute control vector in the second data structure in ROM using the second scalar value.

This may be advantageous in some embodiments because it may be unnecessary to use a vector register to store the permute control vector. Thus, vector registers may be freed to store other data. Additionally, the values of the permute control vector may be pre-stored values such that it may be unnecessary to consume computing cycles to program the pattern into the permute control vector.

The scalar value may be specified in an instruction. In an embodiment, processor 110 is a co-processor and receives the scalar value from another processor. In an embodiment, processor 110 may retrieve the scalar value from main memory or ROM. Moreover, processor 110 may receive the vertical permute control vector and/or the horizontal permute control vector from the other processor.

III. Example Register File

Figure 4:
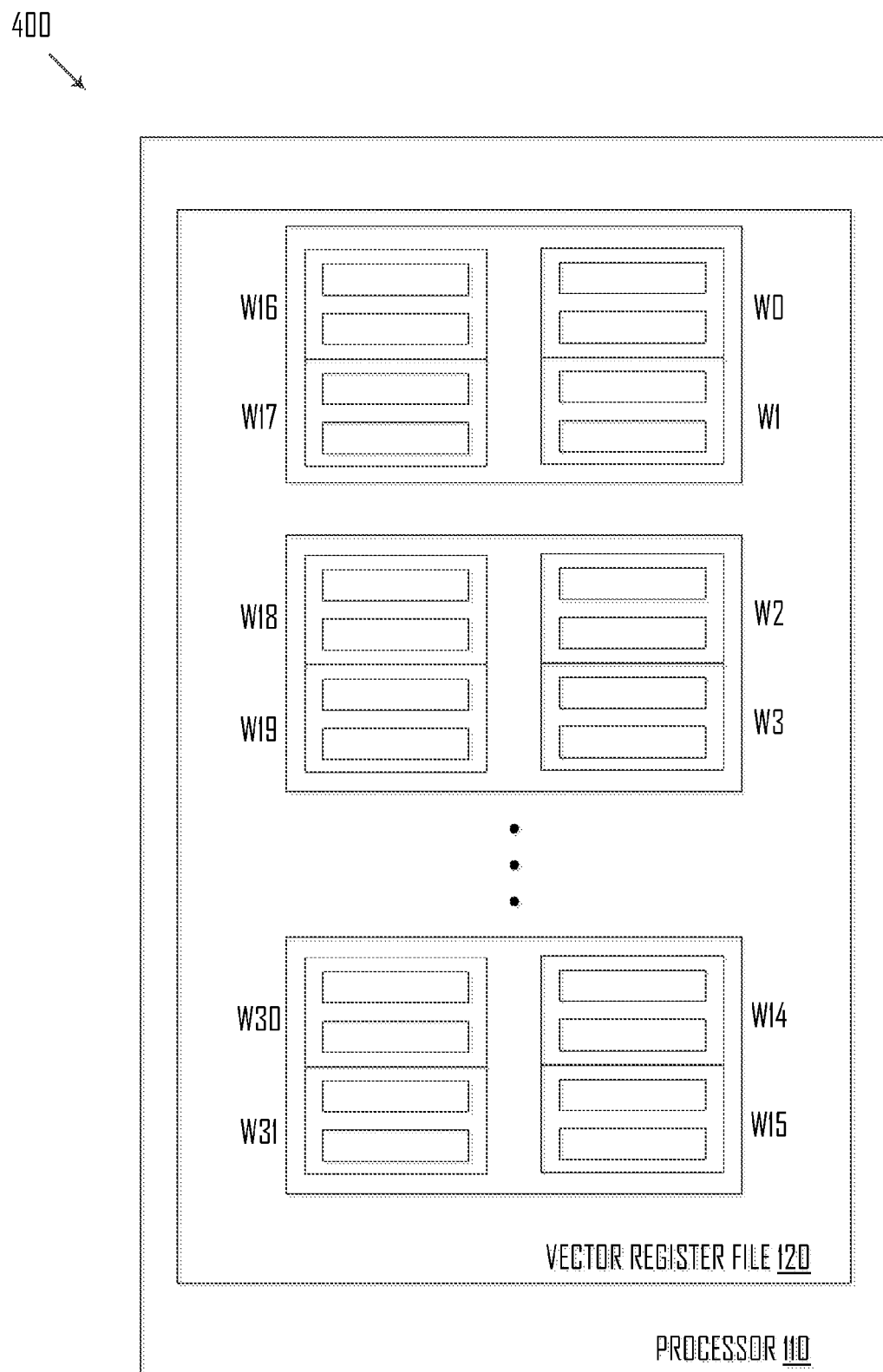
FIG. 4 is a block diagram illustrating a vector register file, according to an embodiment.

FIG. 4 is a block diagram illustrating a vector register file, according to an embodiment.

In an embodiment, processor 110 is an SIMD processor that reads from and writes to vector registers in vector register file 120. In an example, each vector register in vector register file 120 may include Word 0 (W0) 122 that is P bits wide, Word 1 (W1) 124 that is P bits wide, . . . , all the way to Word 31 (W31) that is P bits wide. P may be a whole number greater than zero. The vector registers may be constructed from the smallest granularity of bytes. In an example, vector register file 120 includes 32 vector registers, and each vector register is 1024 bits wide. Each vector register may include 32 words, each word including 32 bits.

In an example, P may be any multiple of 8 (e.g., 8, 16, 32, 64, and so on). Even if P=32, the permute controls may be adjacent to each other such that constructs larger than 32 bits of data may be used. For example, if the words are 32 bits wide and it is desirable to handle data that is 64 bits wide, the same control in the 32 bit chunks may be adjacently placed such that the system may handle and permute 64 bits of data.

IV. Example Methods

Figure 5:
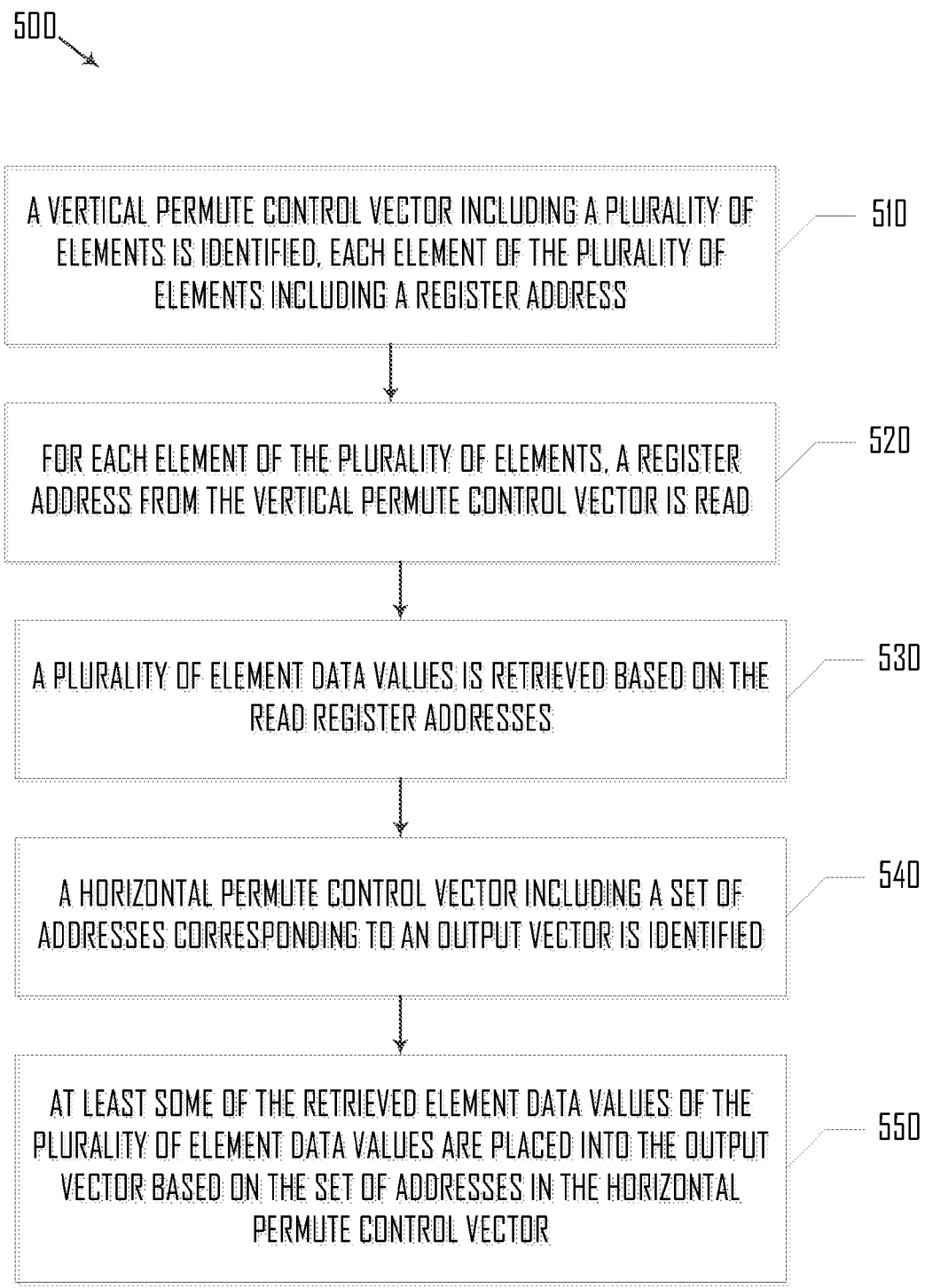
FIG. 5 is a flowchart illustrating a method for placing one or more element data values into an output vector, according to an embodiment.

FIG. 5 is a flowchart illustrating a method 500 for placing one or more element data values into an output vector, according to an embodiment. Method 500 is not meant to be limiting and may be used in other applications.

Method 500 includes steps 510-550. In a step 510, a vertical permute control vector including a plurality of elements is identified, each element of the plurality of elements including a register address. In an example, processor 110 identifies a vertical permute control vector including a plurality of elements, each element of the plurality of elements including a register address. The register addresses stored in the vertical permute control vector may be used to read element data values from one or more vector registers in the vector register file. The vertical permute control vector may be stored in a dynamic register or in static memory. For example, in the read instruction in FIG. 2, processor 110 may identify Vu from the vector register file as the vertical permute control vector. In another example, processor retrieves the vertical permute control vector from ROM.

In a step 520, for each element of the plurality of elements, a register address from the vertical permute control vector is read. In an example, for each element of the plurality of elements, processor 110 reads a register address from the vertical permute control vector. The register addresses in the vertical permute control vector may be used to read from one or more vector registers in a vertical manner. Element data values that are of interest to the processor may be located at the register addresses.

In a step 530, a plurality of element data values is retrieved based on the read register addresses. In an example, processor 110 retrieves a plurality of element data values based on the read register addresses. The retrieved plurality of element data values may be placed into a temporary vector. For example, in FIG. 2, the address of vector register V4[0] is stored in the vertical permute control vector at Vu[0]. The element data value at vector register V4[0] may then be placed into the temporary vector. The retrieved element data values may be of interest to the processor.

In a step 540, a horizontal permute control vector including a set of addresses corresponding to an output vector is identified. In an example, processor 110 identifies a horizontal permute control vector including a set of addresses corresponding to an output vector. The set of addresses stored in the horizontal permute control vector may be used to arrange the retrieved plurality of element data values (e.g., stored in the temporary vector register) in the output vector in a horizontal manner. The horizontal permute control vector may be stored in a dynamic register or in static memory. For example, in the read instruction in FIG. 2, processor 110 may identify Vv from the vector register file as the horizontal permute control vector. In another example, processor retrieves the horizontal permute control vector from ROM.

In a step 550, at least some of the retrieved element data values of the plurality of element data values are placed into the output vector based on the set of addresses in the horizontal permute control vector. In an example, processor 110 places at least some of the retrieved element data values of the plurality of element data values into the output vector based on the set of addresses in the horizontal permute control vector. The element data values of interest may have originally spanned multiple registers with other data dispersed in between. The output vector may then store only the element data values of interest.

It is also understood that additional method steps may be performed before, during, or after steps 510-550 discussed above. For example, method 500 may include steps of writing element data values into at least one output vector. It is also understood that one or more of the steps of method 500 described herein may be omitted, combined, or performed in a different sequence as desired.

Figure 6:
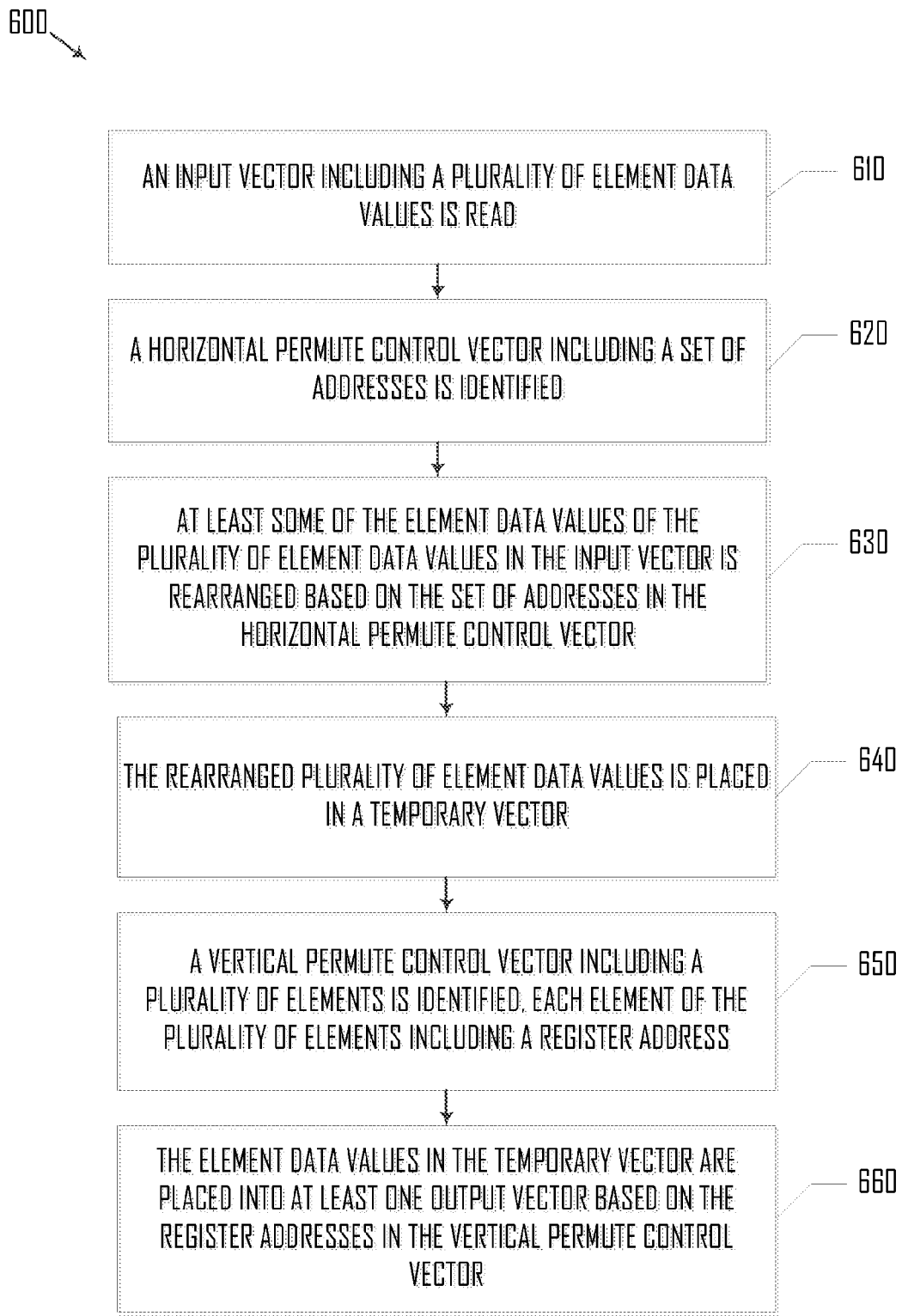
FIG. 6 is a flowchart illustrating a method for writing element data values into at least one output vector, according to an embodiment.

FIG. 6 is a flowchart illustrating a method 600 for writing element data values into a vector register, according to an embodiment. Method 600 is not meant to be limiting and may be used in other applications.

Method 600 includes steps 610-660. In a step 610, an input vector including a plurality of element data values is read. In an example, processor 110 reads an input vector including a plurality of element data values. For example, in FIG. 3, processor 110 may identify Vu from the vector register file as the input vector. In another example, processor retrieves the input vector from ROM. One or more of the element data values stored in the input vector may be written to at least one vector register based on the horizontal permute control vector and the vertical permute control vector.

In a step 620, a horizontal permute control vector including a set of addresses is identified. In an example, processor 110 identifies a horizontal permute control vector including a set of addresses. The horizontal permute control vector may be stored in a dynamic register or in static memory. For example, in the write instruction in FIG. 3, processor 110 may identify vector register Vv from the vector register file as the horizontal permute control vector. In another example, processor retrieves the horizontal permute control vector from ROM.

In a step 630, at least some of the element data values of the plurality of element data values in the input vector is rearranged based on the set of addresses in the horizontal permute control vector. In an example, processor 110 rearranges at least some of the element data values of the plurality of element data values in the input vector based on the set of addresses in the horizontal permute control vector. In particular, the set of addresses stored in the horizontal permute control vector may be used to rearrange the plurality of element data values in the input vector in a horizontal manner.

In a step 640, the rearranged plurality of element data values is placed in a temporary vector. In an example, processor 110 places the rearranged plurality of element data values in a temporary vector. For example, in FIG. 3, Vtmp 204 may be the temporary vector that stores the rearranged plurality of element data values.

In a step 650, a vertical permute control vector including a plurality of elements is identified, each element of the plurality of elements including a register address. In an example, processor 110 identifies a vertical permute control vector including a plurality of elements, each element of the plurality of elements including a register address. The register addresses stored in the vertical permute control vector may be used to write element data values from the temporary vector to at least one vector register in a vertical manner. The vertical permute control vector may be stored in a dynamic register or in static memory. For example, in the write instruction in FIG. 3, processor 110 may identify vector register Vd from the vector register file as the vertical permute control vector. In another example, processor retrieves the vertical permute control vector from ROM.

In a step 660, the element data values in the temporary vector are placed into at least one vector register based on the register addresses in the vertical permute control vector. In an example, processor 110 places the element data values in the temporary vector into at least one vector register based on the register addresses in the vertical permute control vector. For example, in FIG. 3, the element data values in the temporary vector are placed into vector registers V4, V5, V6, and/or V7 based on the register addresses in vector register Vd. The data element values that were stored in input vector Vu may then be appropriately written to one or more vector registers.

It is also understood that additional method steps may be performed before, during, or after steps 610-660 discussed above. For example, method 600 may include a step of placing one or more element data values into a vector register. It is also understood that one or more of the steps of method 600 described herein may be omitted, combined, or performed in a different sequence as desired.

V. Example Wireless Device

Figure 7:
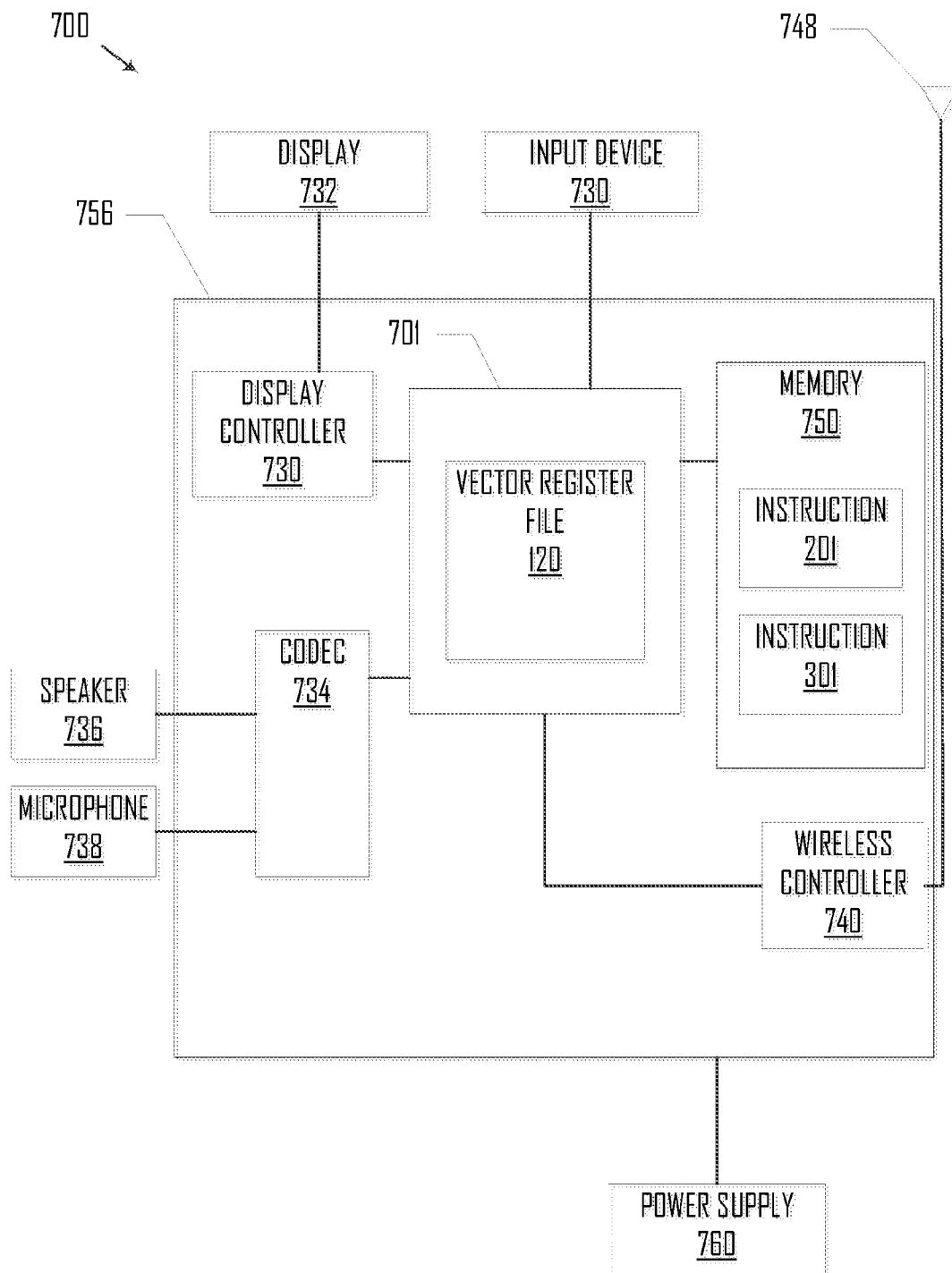
FIG. 7 is a block diagram illustrating a wireless device including a digital signal processor, according to an embodiment.

FIG. 7 is a block diagram illustrating a wireless device 700 including a digital signal processor, according to an embodiment. Device 700 includes a processor, such as a digital signal processor (DSP) 701. Instruction 201 and/or instruction 301 may stored in a memory 750, and VRF 120 may be included in DSP 701. In an example, DSP 701 and VFR 129 may processes instruction 201 and/or instruction 301 according to one or more of FIGS. 1-4, and/or according to one or more of the methods of FIGS. 5 and 6, or any combination thereof.

FIG. 7 also shows a display controller 730 that is coupled to DSP 701 and to a display 732. A coder/decoder (CODEC) 734 may also be coupled to DSP 701. A speaker 736 and a microphone 738 may be coupled to CODEC 734. Additionally, a wireless controller 740 may be coupled to DSP 701 and to a wireless antenna 748. In an embodiment, DSP 701, display controller 730, memory 750, CODEC 734, and wireless controller 740 are included in a system-in-package or system-on-chip device 756.

In an embodiment, input device 730 and a power supply 760 are coupled to system-on-chip device 756. Moreover, in an embodiment, as illustrated in FIG. 7, display 732, input device 730, speaker 736, microphone 738, wireless antenna 748, and power supply 760 are external to system-on-chip device 756. Each of display 732, input device 730, speaker 736, microphone 738, wireless antenna 748, and power supply 760 may be coupled to a component of system-on-chip device 756, such as an interface or a controller.

Those of skill would further appreciate that the various illustrative logical blocks, configurations, modules, circuits, and steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims. Thus, the present disclosure is limited only by the claims.

What is claimed is:

1. A method for placing one or more element data values into an output vector, comprising:
    identifying a vertical permute control vector comprising a plurality of elements, the plurality of elements comprising a corresponding plurality of register addresses each indicating a vector register of a plurality of vector registers;

reading the plurality of register addresses from the plurality of elements of the vertical permute control vector;
retrieving, for the plurality of elements based on the corresponding plurality of register addresses, a plurality of element data values from the plurality of vector registers,
wherein each element data value of the plurality of element data values is retrieved from a vector register of the plurality of vector registers indicated by a corresponding register address, at a location within the vector register having a one-to-one correspondence to a location of the corresponding register address within the vertical permute control vector;
identifying a horizontal permute control vector comprising a set of addresses corresponding to an output vector; and
placing at least some of the plurality of element data values into the output vector based on the set of addresses in the horizontal permute control vector.

2. The method of claim 1, further comprising:
receiving data associated with an instruction;
splitting the received data into the plurality of elements; and
placing the plurality of elements into the vertical permute control vector.

3. The method of claim 1, wherein retrieving the plurality of element data values comprises using a read memory address in the vertical permute control vector as an indirect address to retrieve a respective element data value.

4. The method of claim 1, wherein placing the at least some of the plurality of element data values into the output vector comprises using a crossbar to place the at least some of the plurality of element data values into the output vector.

5. The method of claim 1, wherein identifying the vertical permute control vector comprises identifying a vector register in a vector register file.

6. The method of claim 1, wherein identifying the horizontal permute control vector comprises identifying a vector register in a vector register file.

7. The method of claim 1, further comprising:
receiving a scalar value that references a data structure, wherein identifying the vertical permute control vector comprises identifying the vertical permute control vector in the data structure using the scalar value.

8. The method of claim 1, further comprising:
receiving a scalar value that references a data structure, wherein identifying the horizontal permute control vector comprises identifying the horizontal permute control vector in the data structure using the scalar value.

9. The method of claim 1, further comprising:
placing the plurality of element data values in a temporary vector, wherein placing the at least some of the plurality of element data values into the output vector comprises permuting the temporary vector using the horizontal permute control vector.

10. An apparatus, comprising:
a processor configured to:
identify a vertical permute control vector comprising a plurality of elements, the plurality of elements comprising a corresponding plurality of register addresses each indicating a vector register of a plurality of vector registers;
read the plurality of register addresses from the plurality of elements of the vertical permute control vector;
retrieve, for the plurality of elements based on the corresponding plurality of register addresses, a plurality of element data values from the plurality of vector registers,
wherein each element data value of the plurality of element data values is retrieved from a vector register of the plurality of vector registers indicated by a corresponding register address, at a location within the vector register having a one-to-one correspondence to a location of the corresponding register address within the vertical permute control vector;
identify a horizontal permute control vector comprising a set of addresses corresponding to an output vector; and
place at least some of the plurality of element data values into the output vector based on the set of addresses in the horizontal permute control vector.

11. The apparatus of claim 10, wherein the processor is further configured to identify a vector register in a vector register file, and wherein the identified vector register is the vertical permute control vector.

12. The apparatus of claim 10, wherein the processor is further configured to identify a vector register in a vector register file, and wherein the identified vector register is the horizontal permute control vector.

13. The apparatus of claim 10, wherein the processor is further configured to receive a scalar value that references a data structure, and wherein the vertical permute control vector is stored in the data structure.

14. The apparatus of claim 10, wherein the processor is further configured to receive a scalar value that references a data structure, and wherein the horizontal permute control vector is stored in the data structure.

15. A non-transitory computer-readable medium having stored thereon computer-executable instructions for performing operations, comprising:
identifying a vertical permute control vector comprising a plurality of elements, the plurality of elements comprising a corresponding plurality of register addresses each indicating a vector register of a plurality of vector registers;
reading the plurality of register addresses from the plurality of elements of the vertical permute control vector;
retrieving, for the plurality of elements based on the corresponding plurality of register addresses, a plurality of element data values from the plurality of vector registers,
wherein each element data value of the plurality of element data values is retrieved from a vector register of the plurality of vector registers indicated by a corresponding register address, at a location within the vector register having a one-to-one correspondence to a location of the corresponding register address within the vertical permute control vector;
identifying a horizontal permute control vector comprising a set of addresses corresponding to an output vector; and
placing at least some of the plurality of element data values into the output vector based on the set of addresses in the horizontal permute control vector.

16. An apparatus for placing one or more element data values into an output vector, comprising:
means for identifying a vertical permute control vector comprising a plurality of elements, the plurality of elements comprising a corresponding plurality of register addresses each indicating a vector register of a plurality of vector registers;

means for reading the plurality of register addresses from the plurality of elements of the vertical permute control vector;

means for retrieving, for the plurality of elements based on the corresponding plurality of register addresses, a plurality of element data values from the plurality of vector registers, wherein each element data value of the plurality of element data values is retrieved from a vector register of the plurality of vector registers indicated by a corresponding register address, at a location within the vector register having a one-to-one correspondence to a location of the corresponding register address within the vertical permute control vector;

means for identifying a horizontal permute control vector comprising a set of addresses corresponding to an output vector; and means for placing at least some of the plurality of element data values into the output vector based on the set of addresses in the horizontal permute control vector.

17. A method for writing element data values into an output vector, comprising:

reading an input vector comprising a plurality of element data values;

identifying a horizontal permute control vector comprising a set of addresses;

rearranging at least some of the plurality of element data values in the input vector based on the set of addresses in the horizontal permute control vector;

placing the rearranged at least some of the plurality of element data values in a temporary vector;

identifying a vertical permute control vector comprising a plurality of elements, each element of the plurality of elements comprising a register address indicating a vector register of a plurality of vector registers; and placing the plurality of element data values in the temporary vector into a plurality of the plurality of vector registers based on the register addresses in the vertical permute control vector;

wherein each element data value of the plurality of element data values is placed into a vector register of the plurality of vector registers indicated by a corresponding register address, at a location within the vector register having a one-to-one correspondence to a location of the corresponding register address within the vertical permute control vector.

18. The method of claim 17, wherein identifying the horizontal permute control vector comprises identifying a vector register in a vector register file.

19. The method of claim 17, wherein identifying the vertical permute control vector comprises identifying a vector register in a vector register file.

20. The method of claim 17, further comprising:

receiving a scalar value that references a data structure, wherein identifying the horizontal permute control vector comprises identifying the horizontal permute control vector in the data structure using the scalar value.

21. The method of claim 17, further comprising:

receiving a scalar value that references a data structure, wherein identifying the vertical permute control vector comprises identifying the vertical permute control vector in the data structure using the scalar value.

22. An apparatus, comprising:

a processor configured to:

read an input vector comprising a plurality of element data values;

identify a horizontal permute control vector comprising a set of addresses;

rearrange at least some of the plurality of element data values in the input vector based on the set of addresses in the horizontal permute control vector;

place the rearranged at least some of the plurality of element data values in a temporary vector;

identify a vertical permute control vector comprising a plurality of elements, each element of the plurality of elements comprising a register address indicating a vector register of a plurality of vector registers; and place the plurality of element data values in the temporary vector into a plurality of the plurality of vector registers based on the register addresses in the vertical permute control vector;

wherein each element data value of the plurality of element data values is placed into a vector register of the plurality of vector registers indicated by a corresponding register address, at a location within the vector register having a one-to-one correspondence to a location of the corresponding register address within the vertical permute control vector.

23. A non-transitory computer-readable medium having stored thereon computer-executable instructions for performing operations, comprising:

reading an input vector comprising a plurality of element data values;

identifying a horizontal permute control vector comprising a set of addresses;

rearranging at least some of the plurality of element data values in the input vector based on the set of addresses in the horizontal permute control vector;

placing the rearranged at least some of the plurality of element data values in a temporary vector;

identifying a vertical permute control vector comprising a plurality of elements, each element of the plurality of elements comprising a register address indicating a vector register of a plurality of vector registers; and placing the plurality of element data values in the temporary vector into a plurality of the plurality of vector registers based on the register addresses in the vertical permute control vector;

wherein each element data value of the plurality of element data values is placed into a vector register of the plurality of vector registers indicated by a corresponding register address, at a location within the vector register having a one-to-one correspondence to a location of the corresponding register address within the vertical permute control vector.

24. An apparatus for writing element data values into an output vector, comprising:

means for reading an input vector comprising a plurality of element data values;

means for identifying a horizontal permute control vector comprising a set of addresses;

means for rearranging at least some of the plurality of element data values in the input vector based on the set of addresses in the horizontal permute control vector;

means for placing the rearranged at least some of the plurality of element data values in a temporary vector;

means for identifying a vertical permute control vector comprising a plurality of elements, each element of the plurality of elements comprising a register address indicating a vector register of a plurality of vector registers; and means for placing the plurality of element data values in the temporary vector into a plurality of the plurality of vector registers based on the register addresses in the vertical permute control vector;

wherein each element data value of the plurality of element data values is placed into a vector register of the plurality of vector registers indicated by a corresponding register address, at a location within the vector register having a one-to-one correspondence to a location of the corresponding register address within the vertical permute control vector.

* * * * *